US006452652B1

(12) United States Patent
Moore

(10) Patent No.: US 6,452,652 B1
(45) Date of Patent: Sep. 17, 2002

(54) LIGHT ABSORBING THIN FILM STACK IN A LIGHT VALVE STRUCTURE

(75) Inventor: Paul M. Moore, Burlingame, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/096,914

(22) Filed: Jun. 12, 1998

(51) Int. Cl.[7] .................................................. G02F 1/13
(52) U.S. Cl. ...................................... 349/110; 349/137
(58) Field of Search .................................. 349/110, 111, 349/137

(56) References Cited

U.S. PATENT DOCUMENTS

| 3,235,397 A | | 2/1966 | Millendorfer et al. ...... 117/33.3 |
| 3,356,522 A | | 12/1967 | Libbert ....................... 117/33.3 |
| 4,103,297 A | | 7/1978 | McGreivy et al. ...... 340/324 M |
| 4,185,894 A | | 1/1980 | Hilton et al. ................ 350/338 |
| 4,191,452 A | | 3/1980 | Grinberg et al. ............ 350/342 |
| 4,239,346 A | | 12/1980 | Lloyd .......................... 350/334 |
| 4,335,935 A | * | 6/1982 | Pohlack ....................... 359/585 |
| 4,382,658 A | | 5/1983 | Shields et al. ............... 350/334 |
| 4,431,271 A | | 2/1984 | Okubo ......................... 350/334 |
| 4,470,060 A | | 9/1984 | Yamazaki ..................... 357/41 |
| 4,470,669 A | | 9/1984 | Kubota et al. ............... 350/351 |
| 4,602,850 A | | 7/1986 | DeBenedetti ................ 350/333 |
| 4,839,707 A | | 6/1989 | Shields ........................ 357/23.7 |
| 4,999,619 A | | 3/1991 | Velde .......................... 340/784 |
| 5,159,476 A | | 10/1992 | Hayashi ........................ 359/54 |
| 5,365,355 A | | 11/1994 | Hastings et al. ............... 359/59 |
| 5,461,501 A | | 10/1995 | Sato et al. ..................... 359/59 |
| 5,473,448 A | | 12/1995 | Yoshinaga et al. ............. 359/51 |
| 5,497,025 A | | 3/1996 | Wong .......................... 257/435 |
| 5,570,212 A | * | 10/1996 | Steigerwald ................. 428/332 |
| 5,591,517 A | * | 1/1997 | Takamiya ................. 428/304.4 |
| 5,592,317 A | * | 1/1997 | Fujikawa et al. ............ 349/110 |
| 5,648,861 A | * | 7/1997 | Natsuhori .................... 349/116 |
| 5,706,067 A | | 1/1998 | Colgan et al. ............... 349/114 |
| 5,708,486 A | * | 1/1998 | Miyawaki ..................... 341/44 |
| 5,764,324 A | | 6/1998 | Lu et al. ...................... 349/113 |
| 5,789,761 A | * | 8/1998 | Ihara et al. ................... 257/59 |
| 5,808,714 A | * | 9/1998 | Rowlands et al. ........... 349/110 |
| 5,838,715 A | | 11/1998 | Corzine et al. ................ 372/96 |
| 5,858,519 A | * | 1/1999 | Klinger et al. .............. 359/585 |
| 5,910,021 A | * | 6/1999 | Tabara ......................... 438/636 |
| RE36,308 E | * | 9/1999 | Yang .......................... 359/585 |

OTHER PUBLICATIONS

Cacharelis, P., et al., "18.1: An 0.8–um EEPROM Technology Modified for a Reflective PDLC Light–Valve Application", SID 97 Digest, pp. 289–292 (May 1997).

Sato, F., et al., "L1.2: High Resolution and Bright LCD Projector with Reflective LCD Panels", SID 97 Digest, pp. 997–1000 (1997).

Sugiura, N., et al., "42.1: Designing Bright Reflective Full–color LCD's Using an Optimized Reflector", SID 97 Digest, pp. 1011–1014, (1997).

Moore, P. M., "Reflectance Enhancing Thin Film Stack", Co–pending U.S. application 08/872,013, filed Jun. 9, 1997.

Colgan, E.G., et al., "On–Chip Metallization Layers for Reflective Light Valves", IBM J. Res. Develop. vol. 42 No. 3/4 May/Jul. 1998, pp. 339–345.

(List continued on next page.)

Primary Examiner—Kenneth Parker
(74) Attorney, Agent, or Firm—Stallman & Pollock LLP

(57) ABSTRACT

A light absorbing thin film stack is placed in an upper interconnect level of a pixel cell of an LCD light valve to prevent transmission of light from the small gap between adjacent pixel electrodes into the silicon substrate. The light absorbing thin film stack includes a surface layer combination formed over a highly absorbing backstopping layer. Incident light is absorbed by the backstopping layer. Light reflected by the surface layer combination and/or the backstopping layer is extinguished by destructive interference. This destructive interference is generated by a change in the phase angle caused by the differing optical properties of the various layers of the light absorbing thin film stack.

4 Claims, 16 Drawing Sheets

OTHER PUBLICATIONS

Takayama, S., et al., "Effects of Y or Gd Addition on the Structures and Resistivities of Al Thin Films", J. Vac. Sci. Technol. A 14(4), Jul./Aug. 1996, pp. 2499–2504.

Takayama, S., et al., "Low Resistivity Al–RE (RE=La, Pr, and Nd) Alloy Thin Films with High Thermal Stability for Thin–Film–Transistor Interconnects", J. Vac. Sci. Technol. B 14(5), Sep./Oct. 1996, pp. 3257–3262.

O'hara, A., et al., "Planarisation of Spatial Light Modulator Silicon Back–Planes Using Chemical–Mechanical Polishing", 1994 The Institution of Electrical Engineers, publishes by IEE, Savoy Place, London WC2R OBL. UK, pp. 5/1–5/6.

Castleberry, D. E., et al., "A 1 Mega–Pixel Color a–Si TFT Liquid–Crystal Display", SID 88 Digest, First Ed., May 1987, ISSN 0097–966X, pp. 232–234.

Glueck, J., et al., "Color–TV Projection with Fast–Switching Reflective HAN–Mode Light Valves", SID 92 Digest, ISSN 0097–0966X, pp. 277280.

* cited by examiner

LIGHT ABSORBING THIN FILM STACK IN A LIGHT VALVE STRUCTURE

BACKGROUND OF THE INVENTION

1. Field of the Invention

The present invention relates to light valves utilized in display devices, and in particular, to a light valve incorporating a light absorbing thin film stack to prevent penetration of incident light into the underlying silicon substrate.

2. Description of the Related Art

Liquid crystal displays (LCDs) are becoming increasingly prevalent in high density projection display devices. These conventional high density projection-type color display devices typically include a light source which emits white light. Dichroic mirrors separate the white light into its corresponding red, green and blue (RGB) bands of light. Each of these colored bands of light is then directed toward a corresponding liquid crystal light valve which, depending upon the image to be projected, either permits or prevents light transmission. Those RGB bands of light which are permitted to be transmitted through the light valves are then combined by dichroic mirrors or a prism. A projection lens then magnifies and projects the image onto a projection screen.

FIG. 1 illustrates a conventional LCD projection-type imaging system 100. Imaging system 100 includes a light source 101. White light is emitted from light source 101. Once the light hits the prism 103, the light is separated into its red, green and blue colored bands of light by dichroic filter coatings. Colored light is directed toward liquid crystal display (LCD) light valves 105. When reflected off light valve 105, the colored light waves travel back through the prism and through projection lens 107. Lens 107 magnifies and projects the synthesized color image onto projection screen 109.

Conventional LCD light valves are formed by confining a thin layer of liquid crystal material between a top plate and a bottom plate. The top plate is a translucent substrate (typically glass) having one large electrode on a surface adjacent to the liquid crystal material. The bottom plate is generally interconnect overlying a storage capacitor structure formed within a silicon substrate.

FIG. 2 illustrates a cross-sectional view of adjacent pixel cell structures lacking a light absorbing layer, that form a portion of a conventional light valve. Portion 200 of the conventional light valve includes a glass top plate 202 bonded to an interconnect 204 by a sealing member (not shown). The sealing member serves to enclose a display area and to separate glass plate 202 from interconnect 204 by a predetermined minute distance. Thus, the light valve has an inner cavity 206 defined by the glass plate 202 and interconnect 204. Liquid crystal material 211, such as polymer dispersed liquid crystal (PDLC), is sealed in inner cavity 206.

Portion 200 of the conventional light valve depicted in FIG. 2 shows adjacent pixel cells 210a and 210b having reflective pixel electrodes 212a and 212b, respectively. Reflective pixel electrodes 212a and 212b are formed as part of third metallization layer 214 of interconnect 204. The surfaces of adjacent pixel electrodes 212a and 212b are covered with a reflecting layer 216. Reflecting layer 216, serves to reflect away white light incident to the pixel cell as described above in connection with FIG. 1. Adjacent pixel electrodes 212a and 212b are electrically coupled to respective storage capacitor structures 218a and 218b formed in underlying silicon substrate 205.

During operation of pixel cells 210a and 210b, driving circuits (not shown) are electrically coupled with storage capacitors 218a and 218b through row select lines 220a and 220b formed as part of first metallization layer 222 of interconnect 204. Storage capacitors 218a and 218b in turn transmit voltages to pixel cell electrodes 212a and 212b through portions of first, second, and third metallization layers 222, 224, and 214 of interconnect 204.

First metallization layer 222 is electronically isolated from silicon substrate 205 by first intermetal dielectric layer 226. Second metallization layer 224 is electronically isolated from first metallization layer 222 by second intermetal dielectric layer 225. Third metallization layer 214 is electronically isolated from second metallization layer 224 by third intermetal dielectric layer 228.

The selective application of voltage to pixel electrodes 212a and 212b switches pixel cells 210a and 210b of light valve 200 on and off. Specifically, a voltage applied to a pixel electrode varies the direction of orientation of the liquid crystal material on the pixel electrode. A change in the direction of orientation of the liquid crystal material at the pixel electrode changes the optical characteristics of the light traveling through the liquid crystal. If the light valve contains twisted nematic crystal, light passes through the light valve unchanged where no voltage is applied to the pixel electrode, and the light is polarized if a voltage is applied to the pixel electrode. If the light valve contains PDLC, light passes through the light valve unchanged where a voltage is applied to the pixel electrode, and light is scattered if no voltage is applied to the pixel electrode.

In the conventional light valve shown in FIG. 2, incident white light can penetrate into interconnect 204 through small gap 230 between adjacent pixel electrodes 212a and 212b. Incident light wave 232 can enter small gap 230, refract at corners 234 of the pixel cell electrodes 212a and 212b, and then reflect off of the second layer of interconnect metallization 224 through a variety of paths until finally penetrating silicon substrate 204.

Penetration of incident light 232 into silicon substrate 204 can induce unwanted currents that can disturb the charge present in storage capacitors 218a and 218b. As a result of this fluctuation in charge, the luminance of pixel cells 210a and 210b may change between succeeding write states, causing the image to "flicker." The flicker produced by the penetrating light waves reduces image quality, and can cause eye strain in an observer.

Existing devices have addressed this problem by incorporating a simple light absorbing layer in the interconnect region. FIG. 3 illustrates a cross-sectional view of adjacent pixel cell structures including a simple light absorbing layer, that form a portion of a conventional light valve. The light valve shown in FIG. 3 is identical to the light valve shown in FIG. 2, except that a simple light absorbing layer 350 has been placed within the second intermetal dielectric layer 328. Simple light absorbing layer is typically composed of a highly optically absorbing material, such as TiN.

FIG. 3 indicates that while most of incident light wave 332 entering narrow gap 330 is absorbed by simple light absorbing layer 350, some incident light is reflected from the surface of light absorbing layer 350. This reflected light can travel through interconnect 304 in a variety of paths before penetrating silicon substrate 305 and giving rise to electrical currents within silicon substrate 305, disturbing charges stored in storage capacitor structures 318a and 318b.

Therefore, a need exists for a light absorbing layer that not only absorbs incident light, but which also prevents reflection of incident light that could ultimately lead to penetration of light into the underlying silicon substrate of the pixel cell.

SUMMARY OF THE INVENTION

The present invention relates to a light absorbing thin film stack which is formed above the silicon substrate of an integrated circuit. This light absorbing thin film stack is designed to block penetration of light into the underlying silicon substrate.

In one embodiment of a light valve in accordance with the present invention, a light absorbing thin film stack is formed within the highest level intermetal dielectric of the interconnect.

The light absorbing thin film stack is formed from a surface layer combination and a backstopping absorbing layer. Each of the layers making up the surface layer combination alters the phase angle of light waves as compared to the immediately preceding layer. The thicknesses of the surface layer combination are tailored to generate destructive interference of reflected light. A thick backstopping absorbing layer positioned behind the surface layer combination ensures that there is no transmission of that portion of the incident light not reflected by the surface layer combination.

The optical characteristics of this first embodiment promotes sufficient absorbance of incident light and destructive interference of reflected light to eliminate penetration of light into the underlying silicon substrate.

Specifically, the films making up the surface layer combination are chosen such that the top layer of the stack has a higher index of refraction than the material lying above it. In turn, the middle layer has a lower refractive index than the top layer. The bottom backstopping layer has a higher index of refraction than the middle layer.

In a first embodiment of a light absorbing thin film stack in accordance with the present invention, the surface layer combination is composed of two layers: a thin ($\approx$100 Å) layer of TiN on top of thicker ($\approx$550 Å) layer of silicon dioxide. The backstopping absorbing layer is composed of a thick ($\approx$1700 Å) layer of TiN.

The composition and thickness of the top and middle layers are tailored to yield substantially different optical thicknesses. The differing optical thicknesses force each of the reflected waves to destructively interfere. This destructive interference attenuates the reflectance of light into the intermetal dielectric.

The features and advantages of the present invention will be understood upon consideration of the following detailed description of the invention and the accompanying drawings.

DETAILED DESCRIPTION OF THE INVENTION

Figure 4:
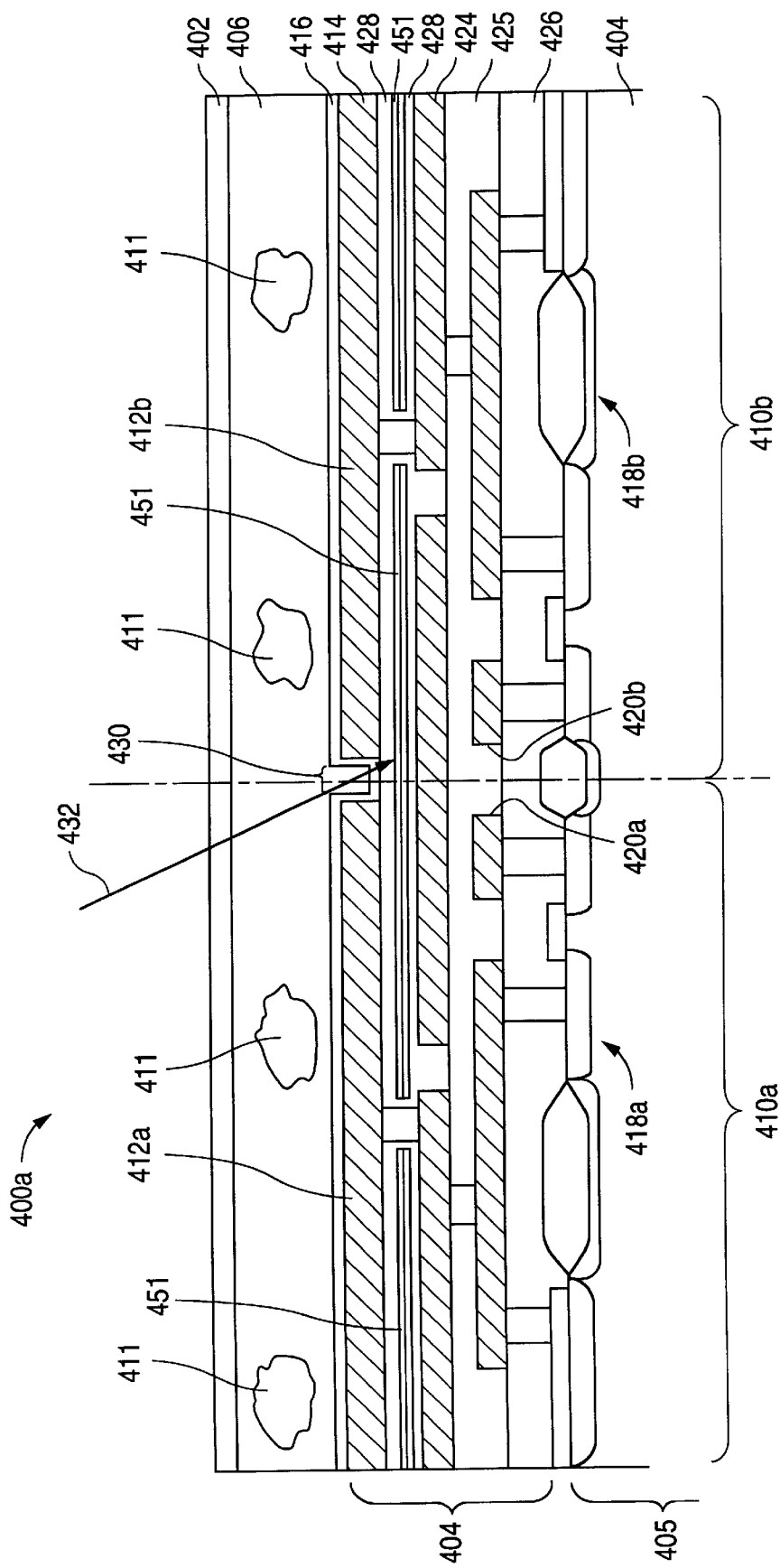
FIG. 4 illustrates a cross-sectional view of adjacent pixel cell structures that include a light absorbing thin film stack in accordance with a first embodiment of the present invention.

FIG. 4 illustrates a cross-sectional view of adjacent pixel cell structures that include a light absorbing thin film stack in accordance with a first embodiment of the present invention. Portion 400 of the light valve includes a glass top plate 402 bonded to a interconnect 404 by a sealing member (not shown). The sealing member serves to enclose a display area and to separate glass plate 402 from interconnect 404 by a predetermined minute distance. Thus, the light valve has an inner cavity 406 defined by the glass plate 402 and interconnect 404. Liquid crystal material 411, such as polymer dispersed liquid crystal (PDLC), is sealed in inner cavity 406.

Figure 1:
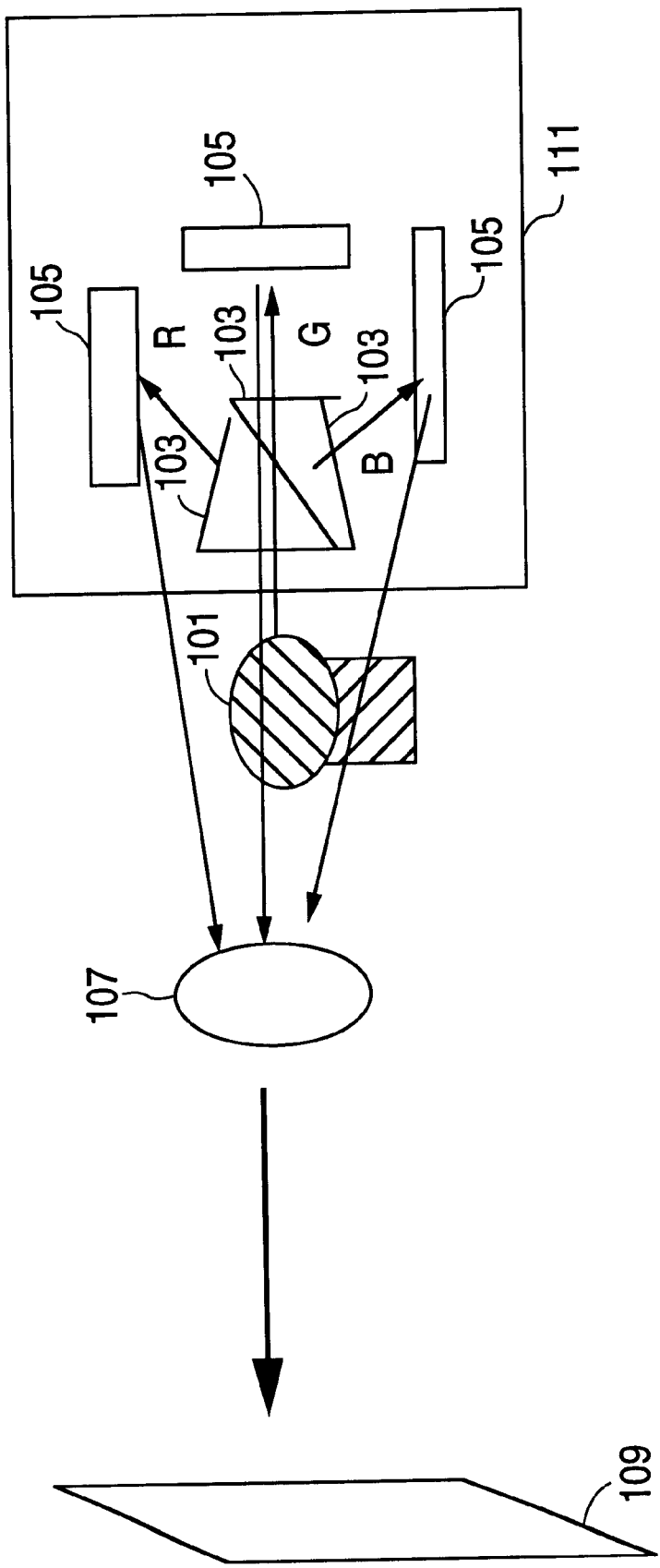
FIG. 1 illustrates a conventional LCD projection system.
Figure 2:
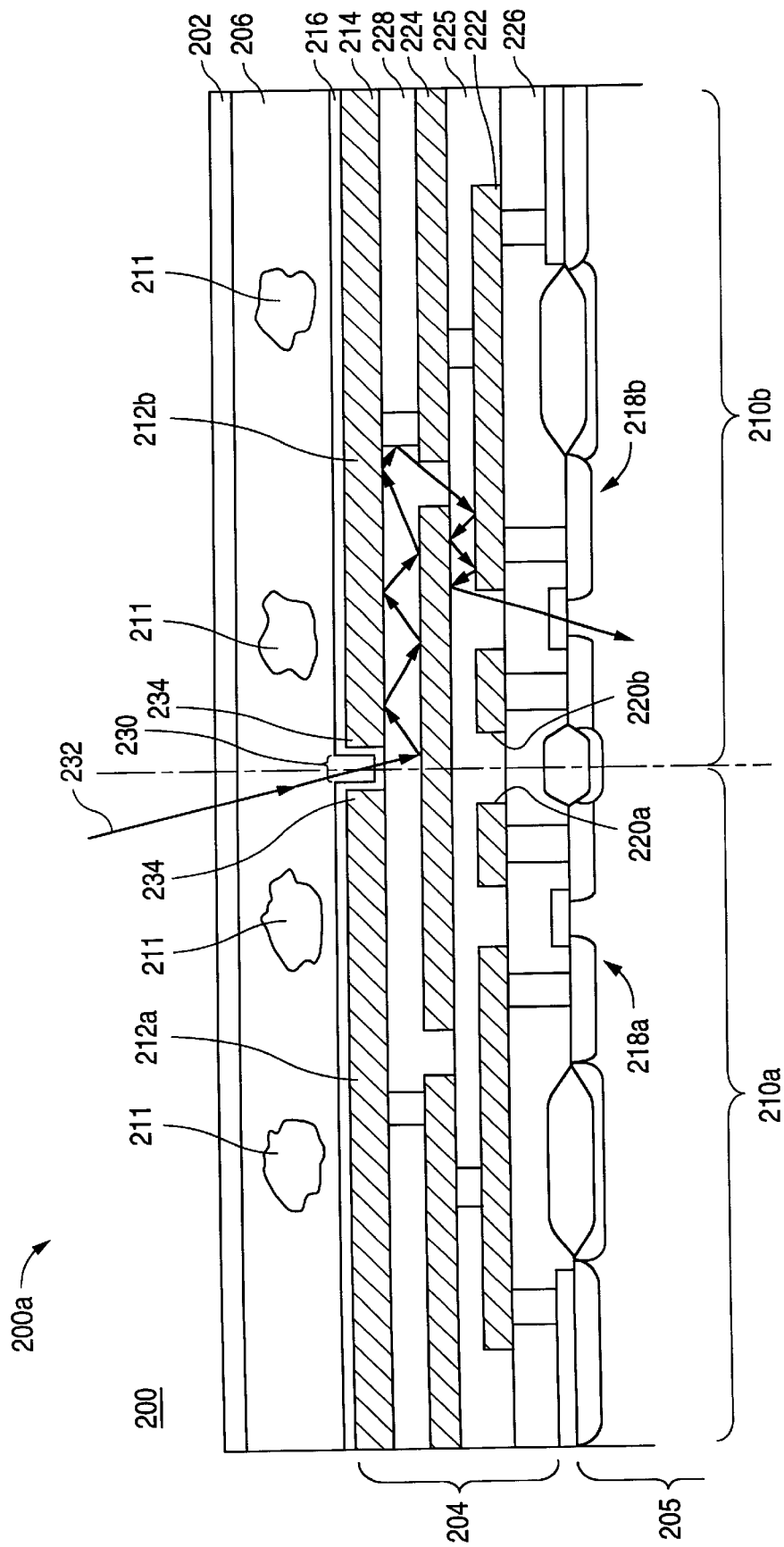
FIG. 2 illustrates a cross-sectional view of adjacent pixel cell structures lacking a light absorbing layer, that form a portion of a conventional light valve.
Figure 3:
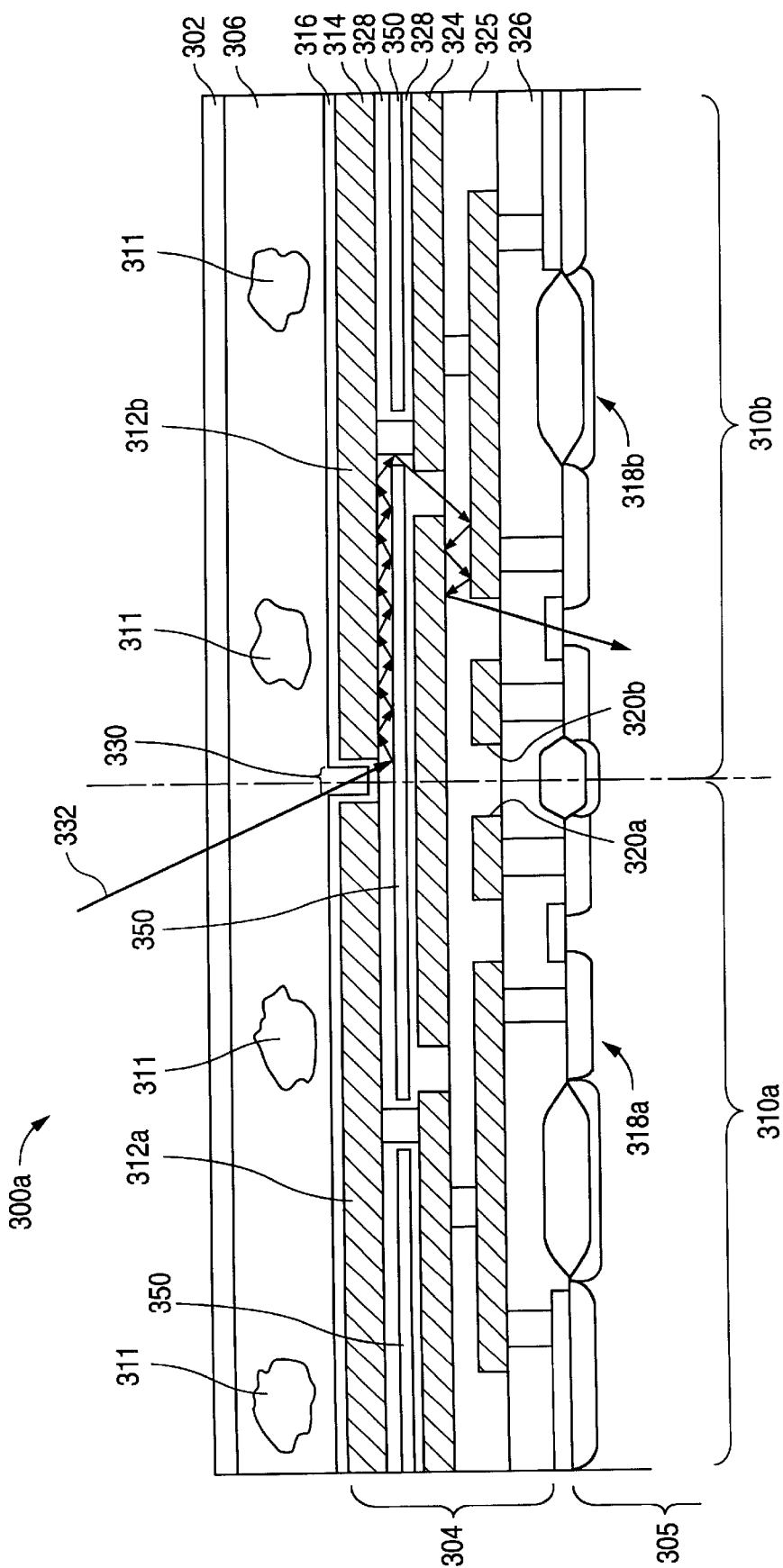
FIG. 3 illustrates a cross-sectional view of adjacent pixel cell structures including a simple light absorbing layer, that form a portion of another type of a conventional light valve.

Portion 400 of the conventional light valve depicted in FIG. 4 shows adjacent pixel cells 410a and 410b having reflective pixel electrodes 412a and 412b, respectively. Reflective pixel electrodes 412a and 412b are formed as part of third metallization layer 414 of interconnect 404. The surfaces of adjacent pixel electrodes 412a and 412b are covered with a reflecting layer 416. Reflecting layer 416 serves to reflect away white light incident to the pixel cell as described above in connection with FIG. 1. Adjacent pixel electrodes 412a and 412b are electrically coupled to respective storage capacitor structures 418a and 418b formed in underlying silicon substrate 405.

During operation of pixel cells 410a and 410b, driving circuits (not shown) are electrically coupled with storage capacitors 418a and 418b through row select lines 420a and 420b formed as part of first metallization layer 422 of interconnect 404. Storage capacitors 418a and 418b in turn transmit voltages to pixel cell electrodes 412a and 412b through portions of first, second, and third metallization layers 422, 424, and 414 of interconnect 404.

First metallization layer 422 is electronically isolated from silicon substrate 405 by first intermetal dielectric layer 426. Second metallization layer 424 is electronically isolated from first metallization layer 422 by second intermetal dielectric layer 425. Third metallization layer 414 is electronically isolated from second metallization layer 424 by third intermetal dielectric layer 428.

The selective application of voltage to pixel electrodes 412a and 412b switches pixel cells 410a and 410b of light valve 400 between the extreme states of on and off. Specifically, a voltage applied to a pixel electrode varies the direction of orientation of the liquid crystal material on the pixel electrode. A change in the direction of orientation of the liquid crystal material at the pixel electrode changes the optical characteristics of the light traveling through the liquid crystal.

If the light valve contains twisted nematic crystal, light passes through the light valve unchanged where no voltage is applied to the pixel electrode, and the light is polarized if a voltage is applied to the pixel electrode. If the light valve contains PDLC, light passes through the light valve unchanged where a voltage is applied to the pixel electrode, and light is scattered if no voltage is applied to the pixel electrode.

In the light valve 400 shown in FIG. 4, incident white light can penetrate into the interior of the pixel cells through the small gap 430 that exists between adjacent pixel electrodes 412*a* and 412*b*. However, light penetrating small gap 430 encounters light absorbing thin film stack 451 within the third intermetal dielectric layer 428.

Figure 5:
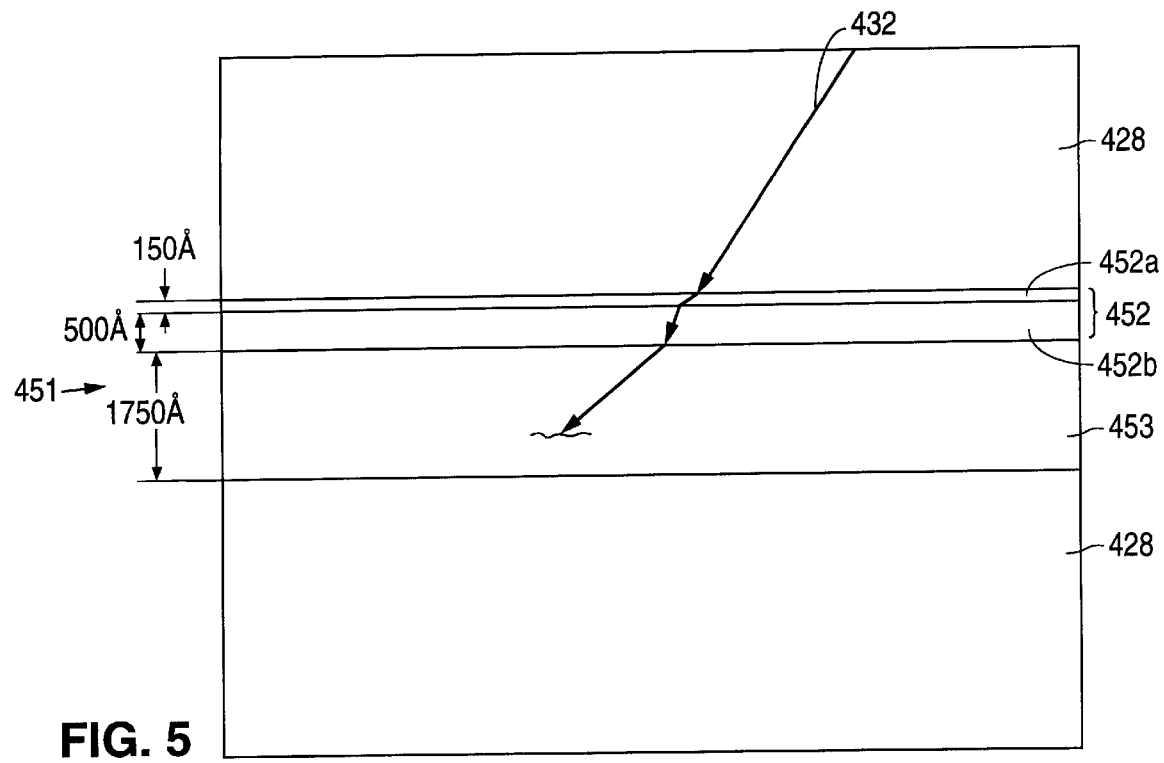
FIG. 5 illustrates a cross-sectional view of the light absorbing thin film stack shown in FIG. 4.

FIG. 5 shows a cross-sectional view of light-absorbing thin film stack 451 in accordance with a first embodiment of the present invention. Light absorbing thin film stack 451 consists of surface layer combination 452 on top of backstopping absorbing layer 453. In this embodiment surface layer combination 452 is composed of two layers: top TiN layer 452*a* and middle silicon dioxide layer 452*b*.

Each of layers 452*a*, 452*b*, and 453 have a different thickness. Top TiN layer 452*a* has a thickness of between about 40–300 Å, with a preferred thickness of about 150 Å. Middle $SiO_2$ layer 452*b* has a thickness of between 200–950 Å, with a preferred thickness of about 500 Å. Backstopping absorbing TiN layer 453 has a thickness of between about 300–2000 Å, with a preferred thickness of about 1750 Å.

Light absorbing thin film stack 451 functions by generating destructive interference between reflected light waves, and by absorbing any light which is neither reflected nor transmitted. To minimize reflectance of the materials that compose the absorbing layer, it is desirable to create changes in the phase angle of reflected light waves, such that the reflected light waves destructively interfere with each other. This purposefully generated destructive interference diminishes the reflectance of the absorbing layer, preventing reflected light from traveling to the silicon substrate.

The operation of the light absorbing thin film stack is explained below. The first explanation utilizes a simplified simple mathematical treatment. The second explanation discusses the actual design of the light absorbing thin film stack utilizing computer-aided modeling.

1. The Simplified Reflectance Model

Equation (1) governs the phase angle of light waves passing through the layers of a light absorbing thin film stack:

$$\phi_v = (2\pi * n_v * d_v / \lambda) * \cos(\theta_v) \quad (1)$$

where v is the dielectric layer, $\phi_v$ is the phase angle of the light wave, $n_v$ is the index of refraction of the layer, $\lambda$ is the wavelength of the light wave, $d_v$ is the thickness of the layer, and $\theta_v$ is the angle of refraction.

The complex index of refraction $n_v$ of a particular layer is governed by the following equation:

$$n_v = n - j*k \quad (1A)$$

where n is the real portion of the index of refraction, j is the imaginary root, and k is the extinction coefficient.

The phase angle of the reflected wave is determined by the following equation:

$$\phi_v = arg[(n_v - n_{v-1})/(n_v + n_{v-1})] \quad (2)$$

The angle of refraction $\theta_v$ of Equation (1) can be determined using Snell's law.

$$\theta_{v-1} * \sin(\theta_{v-1}) = \theta_v * \sin(\theta_v) \quad (3)$$

where $\theta_{v-1}$ is the angle of incidence.

Considering equations (1), (2), and (3), it is apparent that the parameters governing behavior of the light absorbing thin film stack in accordance with the present invention are 1) the index of refraction ($n_v$), and 2) the thickness ($d_v$) of the thin film. Thus, the thickness and composition of the layers of the light absorbing thin film stack can be adjusted to provide the optimal shift in the phase angle of light reflected and transmitted by the various layers.

Figure 6:
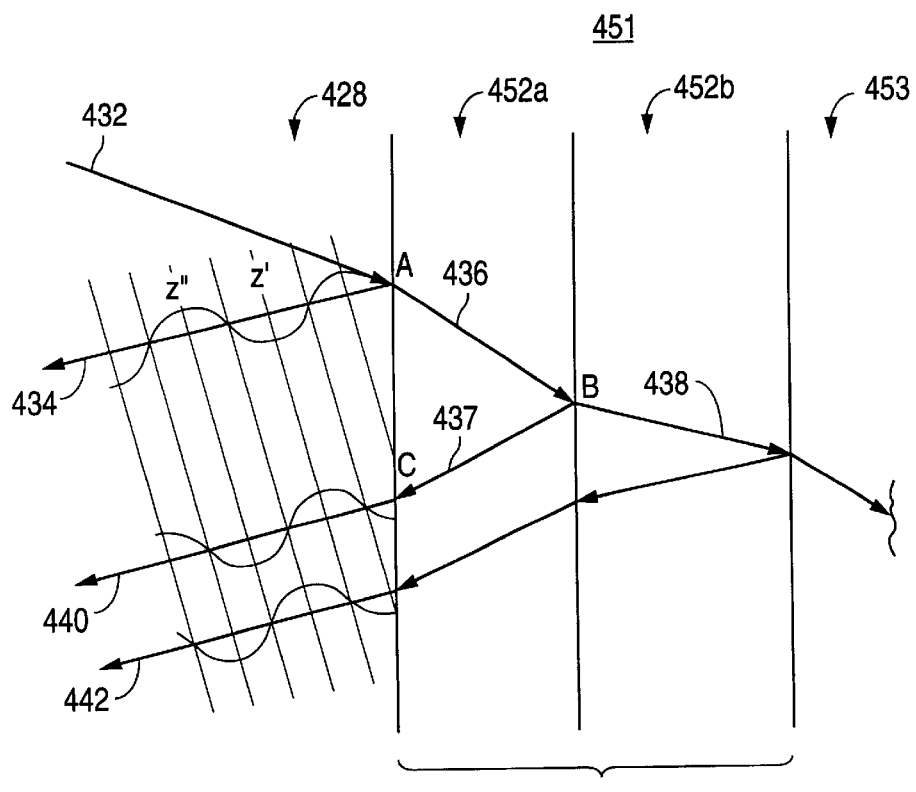
FIG. 6 illustrates a reflection diagram of the light absorbing thin film stack of FIGS. 4 and 5.

A simplified description of the operation of the light absorbing thin film stack is illustrated with reference to FIG. 6. FIG. 6 shows a reflection diagram of the light absorbing thin film stack 451 shown in FIGS. 4 and 5.

In FIG. 6, top TiN layer 452*a* has a greater refractive index than the overlying third intermetal dielectric layer 428. Middle silicon dioxide layer 452*b* has a smaller refractive index than top TiN layer 452*a*. Backstopping absorbing layer 453 has a greater refractive index than middle silicon dioxide layer 452*b*.

Incident light wave 432 travels from intermetal dielectric layer 428 to the surface of top TiN layer 452*a*, part of the incident light wave 432 is reflected at point A as light wave 434, while the remainder is absorbed by the TiN or transmitted into middle layer 452*b*. Once transmitted light wave 436 then encounters middle layer 452*b*, where a portion is reflected at point B as light wave 437, while the remainder is transmitted into middle layer 452*b* as twice-transmitted light wave 438. Light wave 437 travels back through the middle layer 452*b* and eventually emerges from top layer 452*a* at point C as light wave 440.

Upon encountering backstopping absorbing layer 453, a portion of twice-transmitted wave 438 is reflected as wave 442 by the backstopping absorbing layer 453, while the remainder of wave 438 enters into and is absorbed by backstopping absorbing layer 453. Reflected wave 442 then passes back though the middle layer 452*b* to emerge from the top layer 452*a*.

Each of the light waves 434, 440, and 442 reflected by light absorbing stack 451 interfere with one another. Light wave 440 emerging from the surface of top layer 452*a* at point C must travel further by the extra distance ABC than light wave 434 reflected at point A on top layer 452. This distance traveled has the effect of altering the phase of the emerging waves as compared to the incident wave.

An example of this destructive interference is depicted in FIG. 6, where at point Z' reflected light wave 434 is at a trough, while reflected light wave 440 is at a peak. However at point Z" reflected light wave 434 is a peak, while reflected light wave 440 is at a trough.

2. Computer-Aided Reflectance Modelling

Unfortunately, the simplified reflectance model discussed above suffers from a number of difficulties. One problem is that performing the above-described mathematical calculations becomes extremely laborious for light absorbing stacks consisting of more than two thin films.

Additionally, thin films do not exhibit a constant index of refraction over the spectrum of visible light. Instead, the index of refraction of the thin films varies according to the wavelength of incident light. As a result, optimization of the absorbing character of the thin film stack requires optimization across the entire visible spectrum. The requirement of optimizing performance of the stack over the visible light spectrum further complicates the calculations.

Therefore, actual design of the light absorbing thin film stack invention was performed by taking advantage of computer-aided modeling. The commonly utilized matrix method for solving reflectance and transmission problems, as set forth in the *Handbook of Optics* (CD-ROM Ver.), J. A. Dobrowolski, Vol. I, Part 11, Ch. 42, pp. 9–13 (McGraw-Hill, 1997), served as the theoretical basis for this computer modelling.

Modelling was performed on a Memorex Telex Celeria MT and an NEC Versa 6030H utilizing the computer program *Mathcad Plus 6.0 Professional Edition,* Mathsoft, Inc. 1986–1995. This program required the user to input values for the following parameters: 1) material dispersion; 2) film thickness; and 3) index of refraction of the films as function of wavelength. Based upon these inputs, the program then calculated the total reflectance value for the thin film stack.

Figure 7:
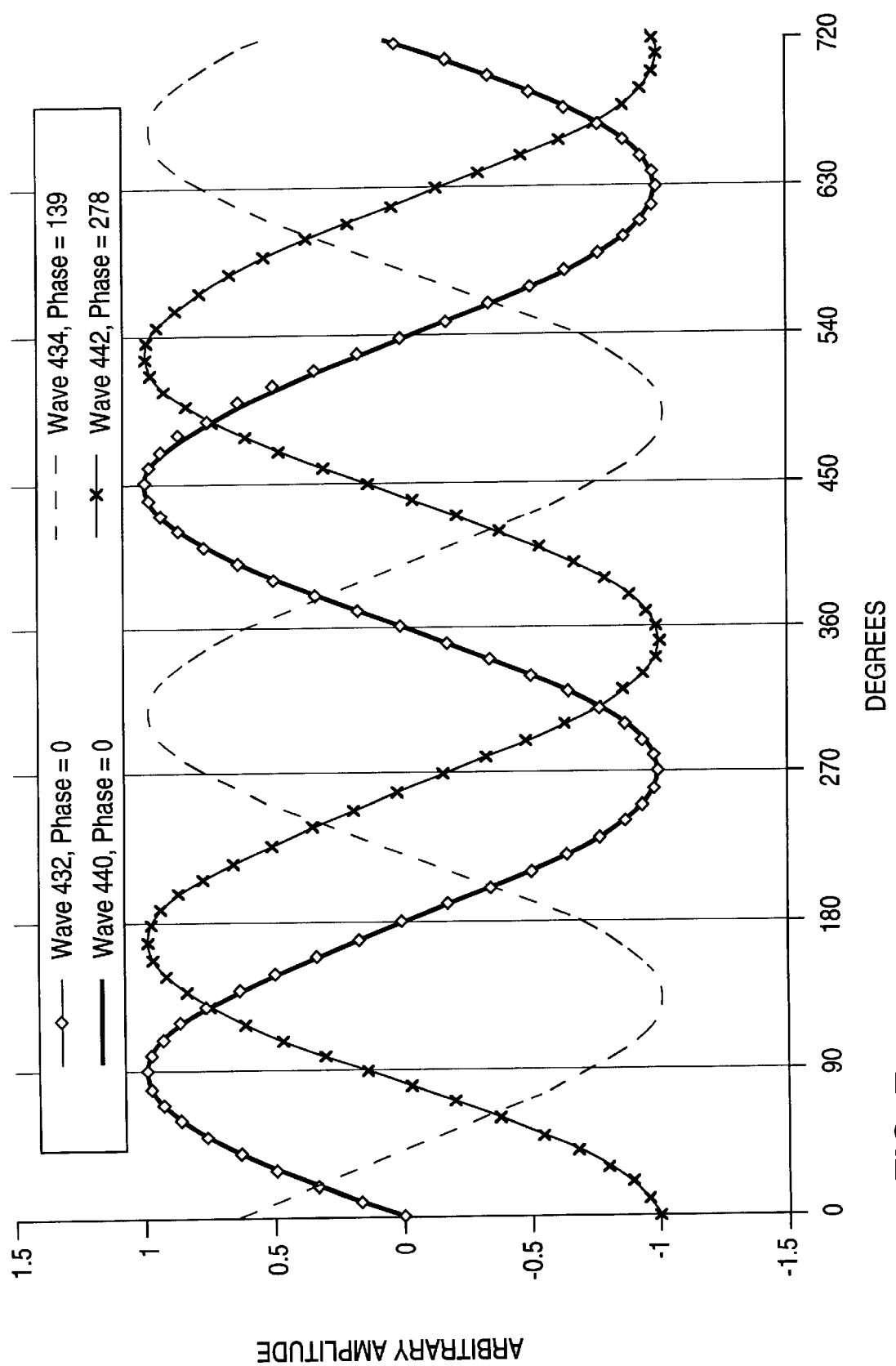
FIG. 7 illustrates the relative shift of the phase angle between reflected light waves shown in FIG. 6.

FIG. 7 illustrates the relative shift of the phase angle between reflected light waves 432, 434, 440, and 442 shown in FIG. 6. FIG. 7 reveals that light wave 434 is reflected from light absorbing thin film stack 451 at a phase angle of +139° relative to incident light wave 432. Once-transmitted light wave 440 is reflected from light absorbing thin film stack 451 at a phase angle of 0° relative to incident light wave 432. Twice-transmitted light wave 442 is reflected from light absorbing thin film stack 451 at a phase angle of +278° relative to incident light wave 432.

Assuming that the reflected light waves maintain the initial arbitrary amplitude of incident light wave 432, FIG. 7 reveals that reflected light waves 434, 440, and 442 destructively interfere with one another. This destructive interference attenuates the amount of light reflected from the light absorbing thin film stack in accordance with the present invention.

FIGS. 8A–8D illustrate the results of computer modeling of reflectance of a variety of three-layered light absorbing thin film stacks that utilize TiN for the top and backstopping layers.

Figure 8A:
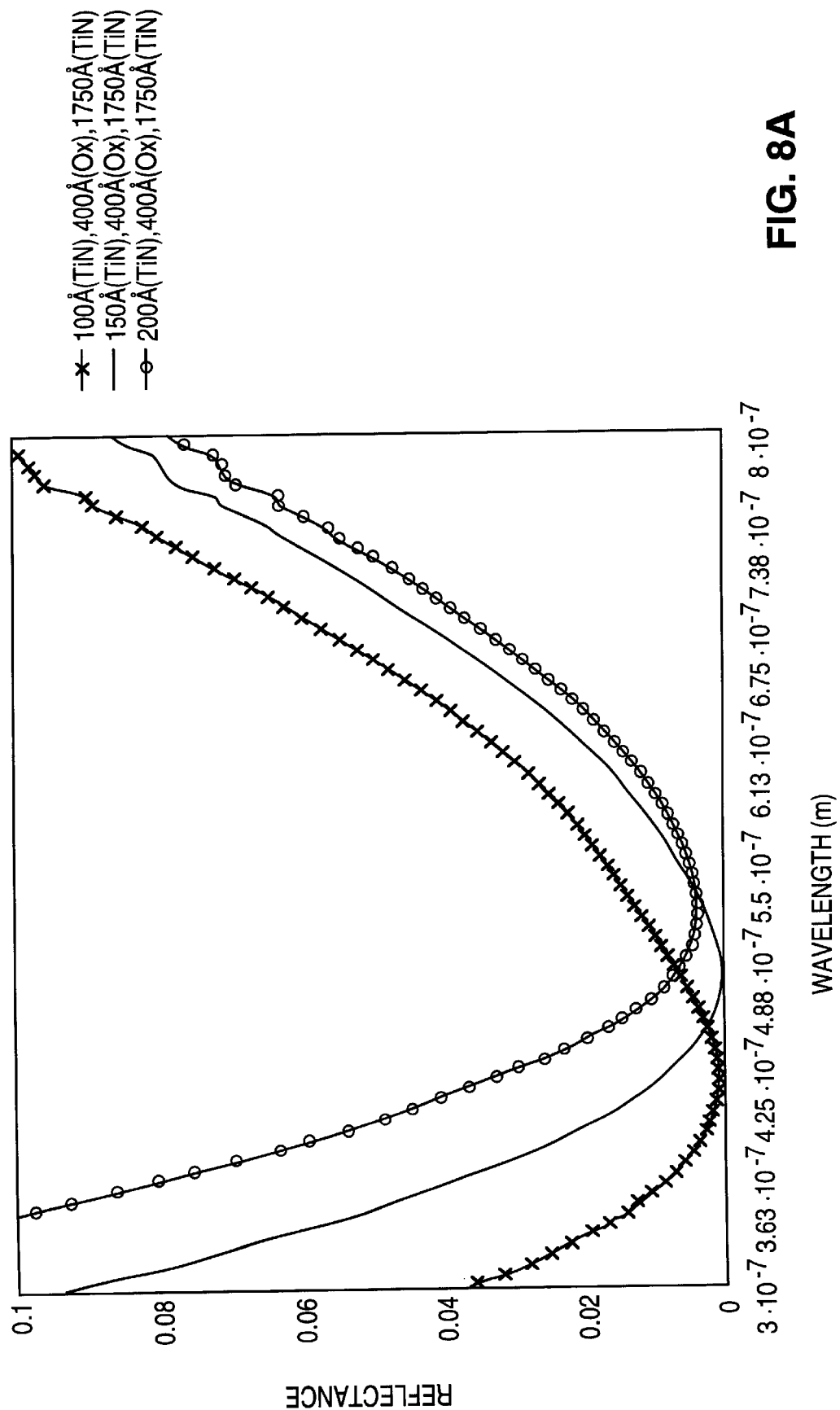
FIGS. 8A–8D illustrate the results of computer modeling of reflectance of a variety of three-layered light absorbing thin film stacks utilizing TiN for the top and backstopping layers.

FIG. 8A plots reflectance for a set of light absorbing thin film stacks having a 1750 Å TiN backstopping layer, a 400 Å $SiO_2$ middle layer, and a top TiN layer of thickness 100 Å, 150 Å, or 200 Å.

Figure 8B:
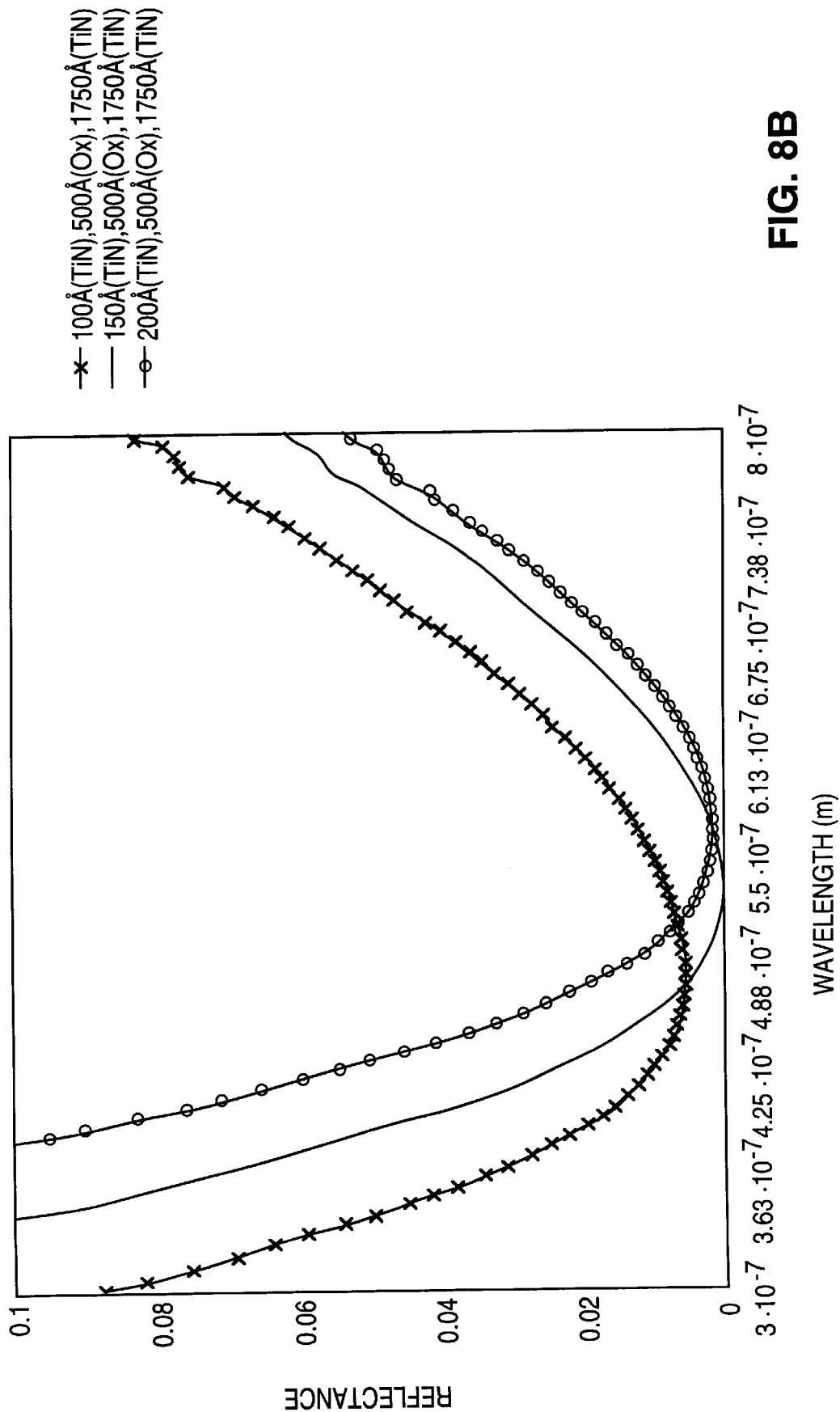

FIG. 8B plots reflectance for a set of light absorbing thin film stacks having a 1750 Å TiN backstopping layer, a 500 Å $SiO_2$ middle layer, and a top TiN layer of thickness 100 Å, 150 Å, or 200 Å.

Figure 8C:
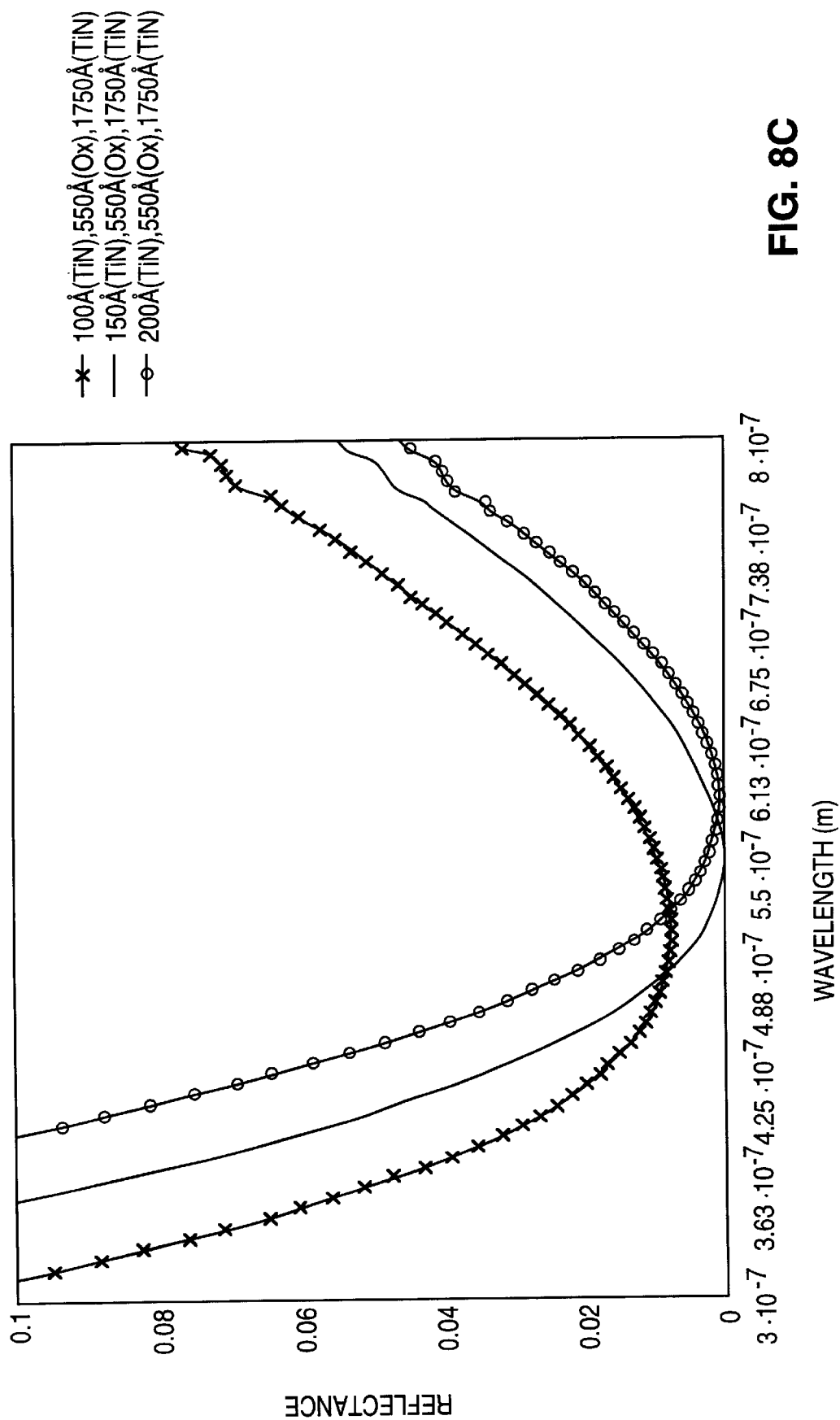

FIG. 8C plots reflectance for a set of light absorbing thin film stacks having a 1750 Å TiN backstopping layer, a 550 Å $SiO_2$ middle layer and a top TiN layer of thickness 100 Å, 150 Å, or 200 Å.

Figure 8D:
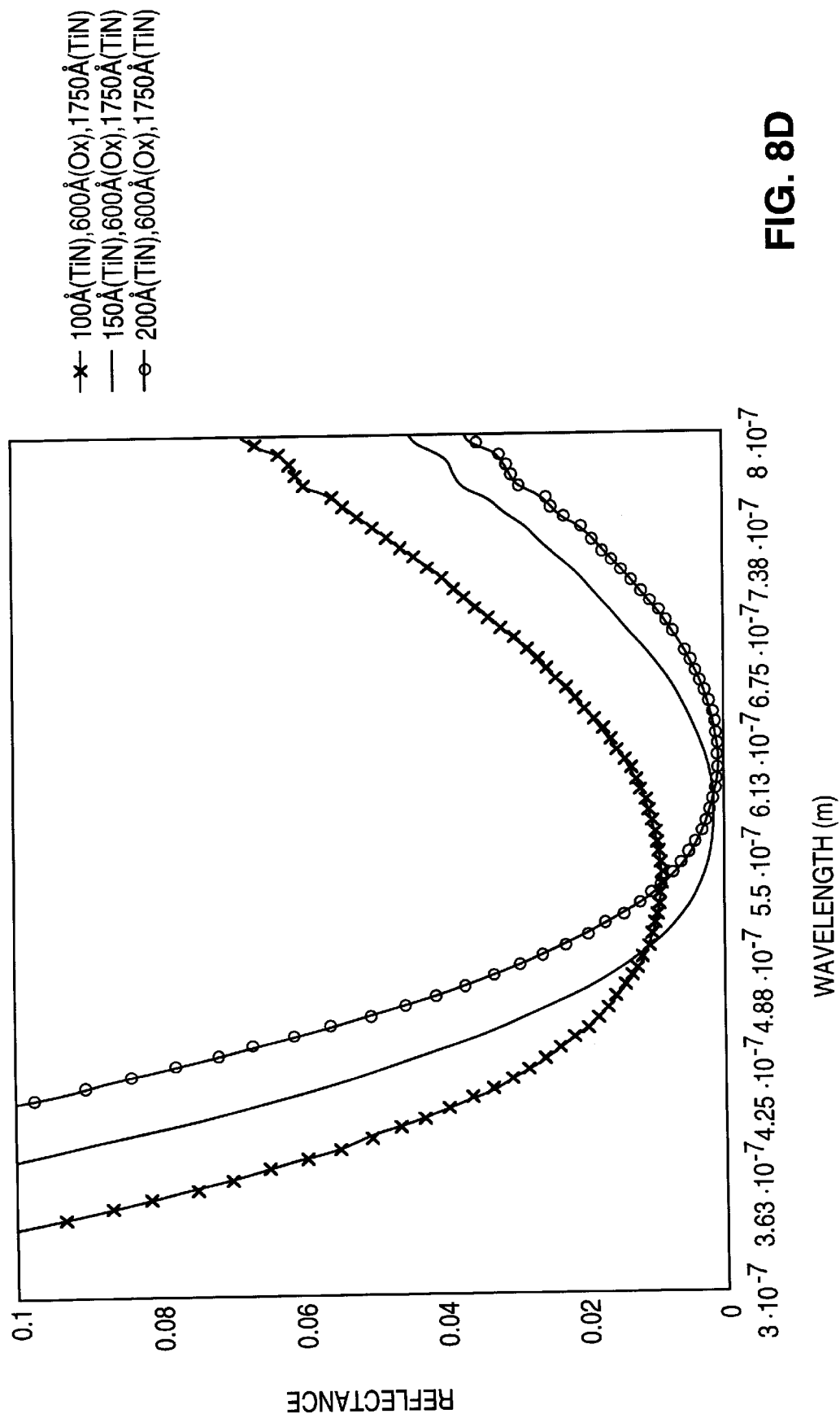

FIG. 8D plots reflectance for a set of light absorbing thin film stacks having a 1750 Å TiN backstopping layer, a 600 Å $SiO_2$ middle layer, and a top TiN layer of thickness 100 Å, 150 Å, or 200 Å.

Simple visual inspection of FIGS. 8A–8D reveals that the wavelength exhibiting minimal reflectance increased as the thickness of the middle layer increased. The lowest reflectance at the approximate center of the visible spectrum (570 nm) was achieved utilizing a light absorbing thin film stack having a thickness of 150 Å/500 Å/1750 Å, as shown in FIG. 8B. Of course, other combinations exhibit superior reflectance over other portions of the spectrum of visible light.

Figure 9:
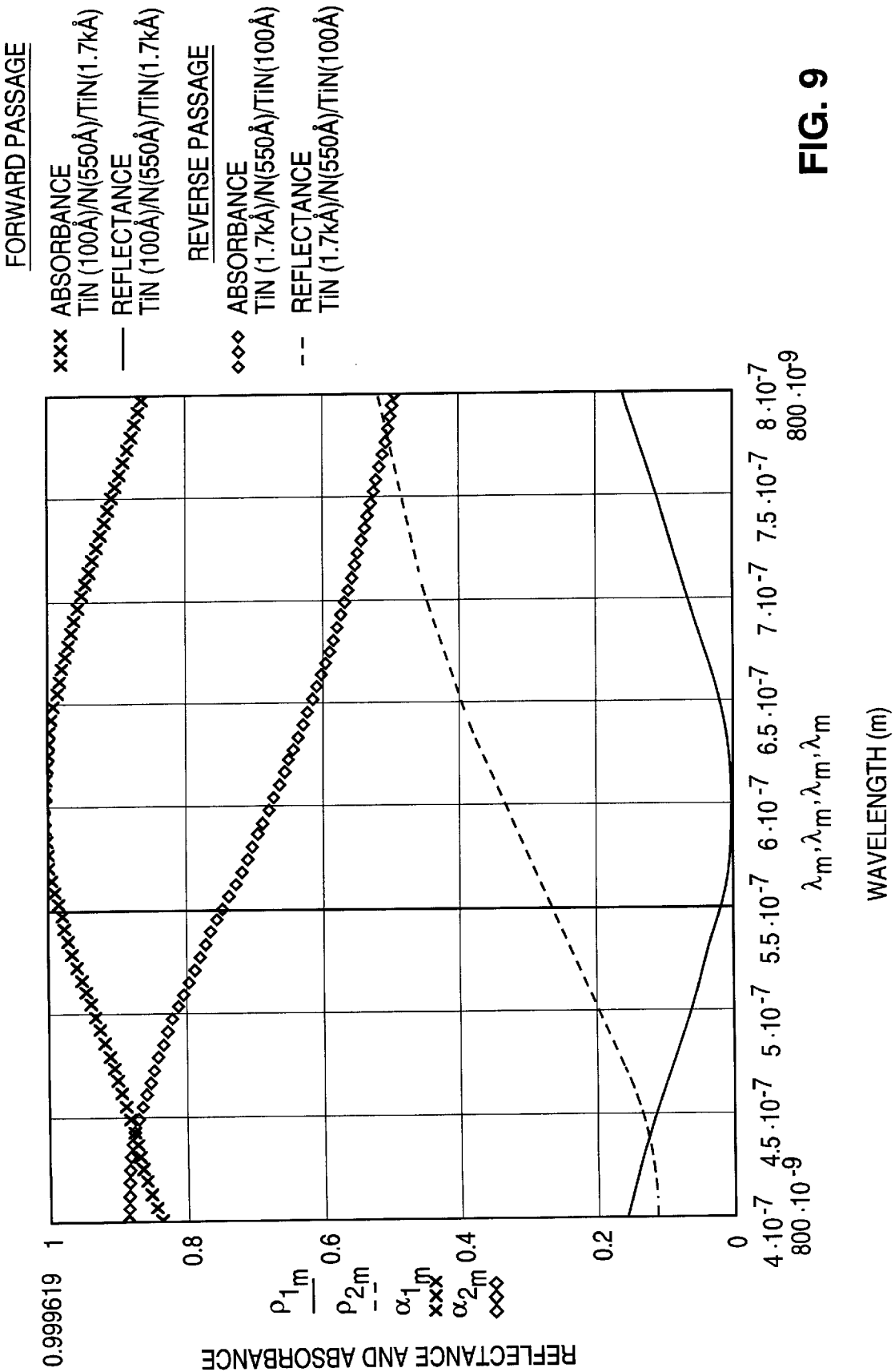
FIG. 9 illustrates the result of computer modelling of reflectance of light passing in the forward and reverse direction through a three layer light absorbing stack utilizing silicon nitride for the middle layer.

FIG. 9 illustrates the result of computer modelling of reflectance of light passing in the forward and reverse direction through a three layer light absorbing stack utilizing silicon nitride for the middle layer. This alternative embodiment of the thin film stack is almost identical to the preferred embodiment shown in FIGS. 5–7, except that it includes a 550 Å middle $Si_3N_4$ film and a 1700 Å bottom film.

FIG. 9 indicates that because of the high absorbance of TiN and the thickness of the 1700 Å backstopping absorbing TiN layer, there is no net transmission of visible incident light through the light absorbing thin film stack. This means that all incident light is either reflected or absorbed.

Moreover, at the median wavelength of visible light (600 nm), the net absorbance of light absorbing thin film stack is 100%, with no light reflected. At visible light wavelengths greater or less than 600 nm, some percentage of the incident light will be reflected rather than absorbed. It is this reflected light for which the destructive interference characteristic of the light absorbing thin film stack is designed.

FIG. 9 also illustrates the theoretical optical properties of the reverse passage of light through the light absorbing thin film stack. FIG. 9 reveals that when light initially encounters thick (1700 Å) backstopping TiN layer, followed by the middle (500 Å) $Si_3N_4$ layer and then top thin (100 Å) TiN layer, net transmission of incident visible light through the light absorbing thin film stack occurs.

The theoretical modeling of the reverse passage of light through light absorbing thin film stack in FIG. 9 illustrates the importance of the relative thickness and order of the layers comprising the light absorbing thin film stack. As shown in FIG. 9, during reverse passage, some small amounts of light will penetrate through the thick backstopping TiN layer and enter the silicon substrate.

Although FIGS. 4–7 above have focused upon describing the TiN/$SiO_2$/TiN (150 Å/500 Å/1750 Å) light absorbing thin film structure, it should be understood that the invention as claimed should not be unduly limited to this specific embodiment. Various other modifications and alterations in the structure and method of operation of this invention will be apparent to those skilled in the art, without departing from the scope of the present invention.

Figure 10A:
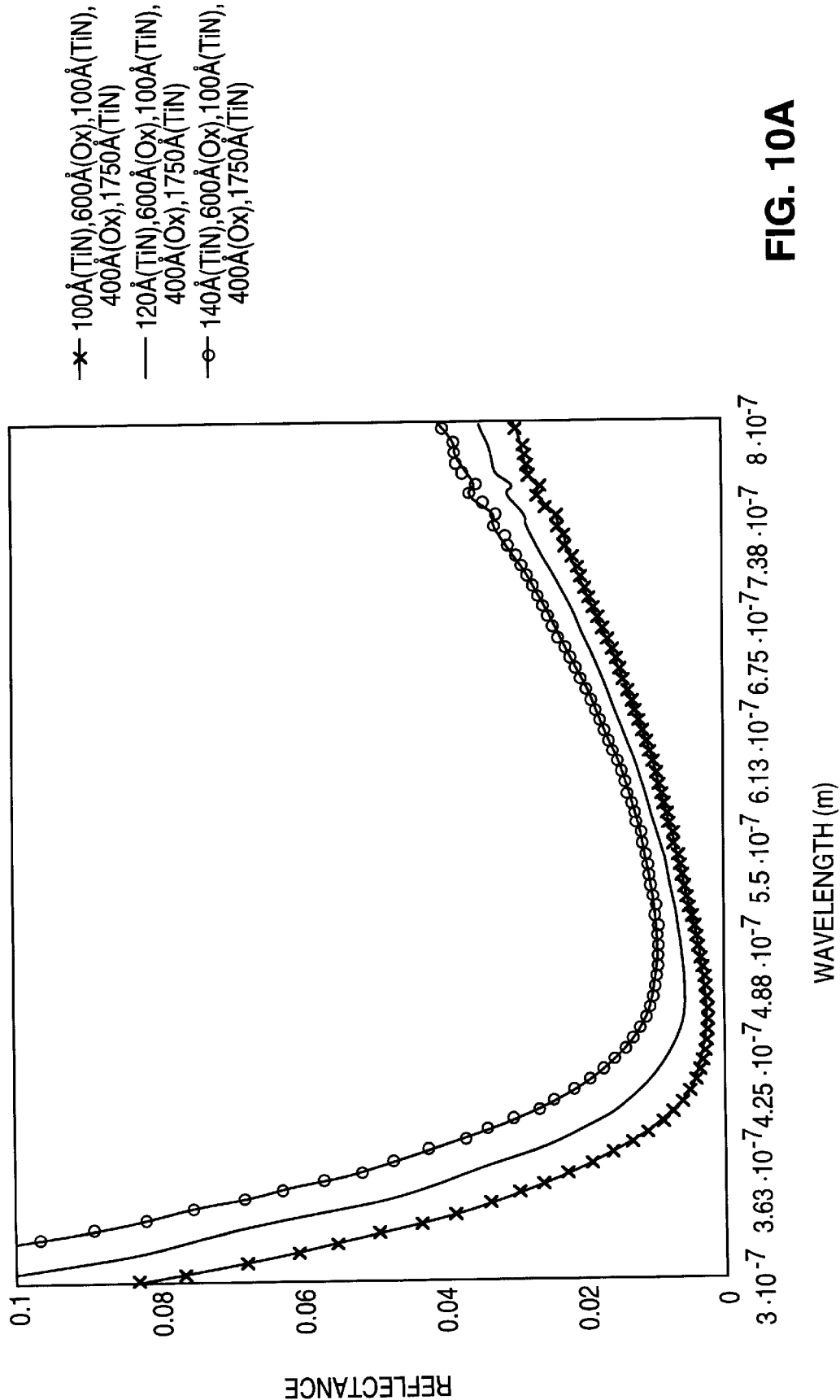
FIGS. 10A–10B illustrate the results of computer modeling of reflectance of a variety of five-layered light absorbing thin film stacks.
Figure 10B:
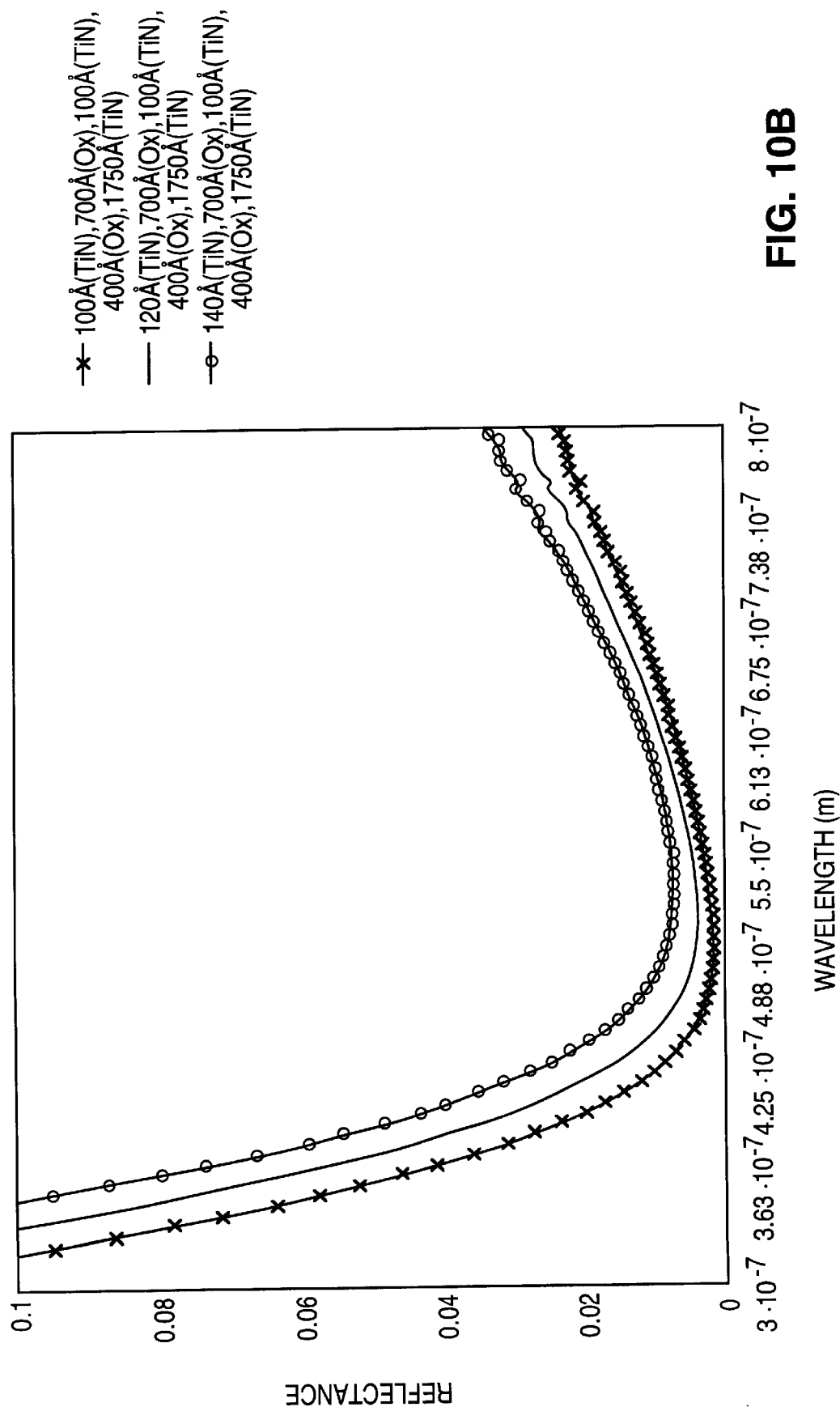

For example, the light absorbing thin film stack in accordance with the present invention is not limited to three layers. Rather, the surface layer combination may be formed from more than two layers as long as each layer possesses sufficiently different optical Properties from the immediately adjacent layers to ensure destructive interference. FIGS. 10A–10B illustrate the results of computer modeling of reflectance of a variety of five-layered light absorbing thin film stacks.

FIG. 10A plots reflectance for a set of light absorbing thin film stacks having a 1750 Å TiN backstopping layer, a 400 Å $SiO_2$ second layer, a 100 Å TiN third layer, a 600 Å $SiO_2$ fourth layer, and a top TiN layer of thickness 100 Å, 120 Å, or 140 Å.

FIG. 10A plots reflectance for a set of light absorbing thin film stacks having a 1750 Å TiN backstopping layer, a 400 Å $SiO_2$ second layer, a 100 Å TiN third layer, a 700 Å $SiO_2$ fourth layer, and a top TiN layer of thickness 100 Å, 120 Å, or 140 Å.

The five layer light absorbing thin film stacks shown in FIGS. 10A–10B exhibit particularly strong absorbance characteristics in the lower region of the visible light spectrum. This characteristic may render such light absorbing structures particularly well-suited for applications requiring the absorption of light at these wavelengths.

In addition, a light absorbing thin film stack in accordance with the present invention could also be formed from materials other than the TiN and silicon dioxide previously described. For example, silicon nitride may be substituted for silicon dioxide as the substantially nonabsorbing middle layer, as discussed previously in FIG. 9. Of course, because $Si_3N_4$ and $SiO_2$ do not posses exactly the same optical properties, the relative thickness of the layers would require adjustment in order to achieve the desired degree of destructive interference.

Figure 11A:
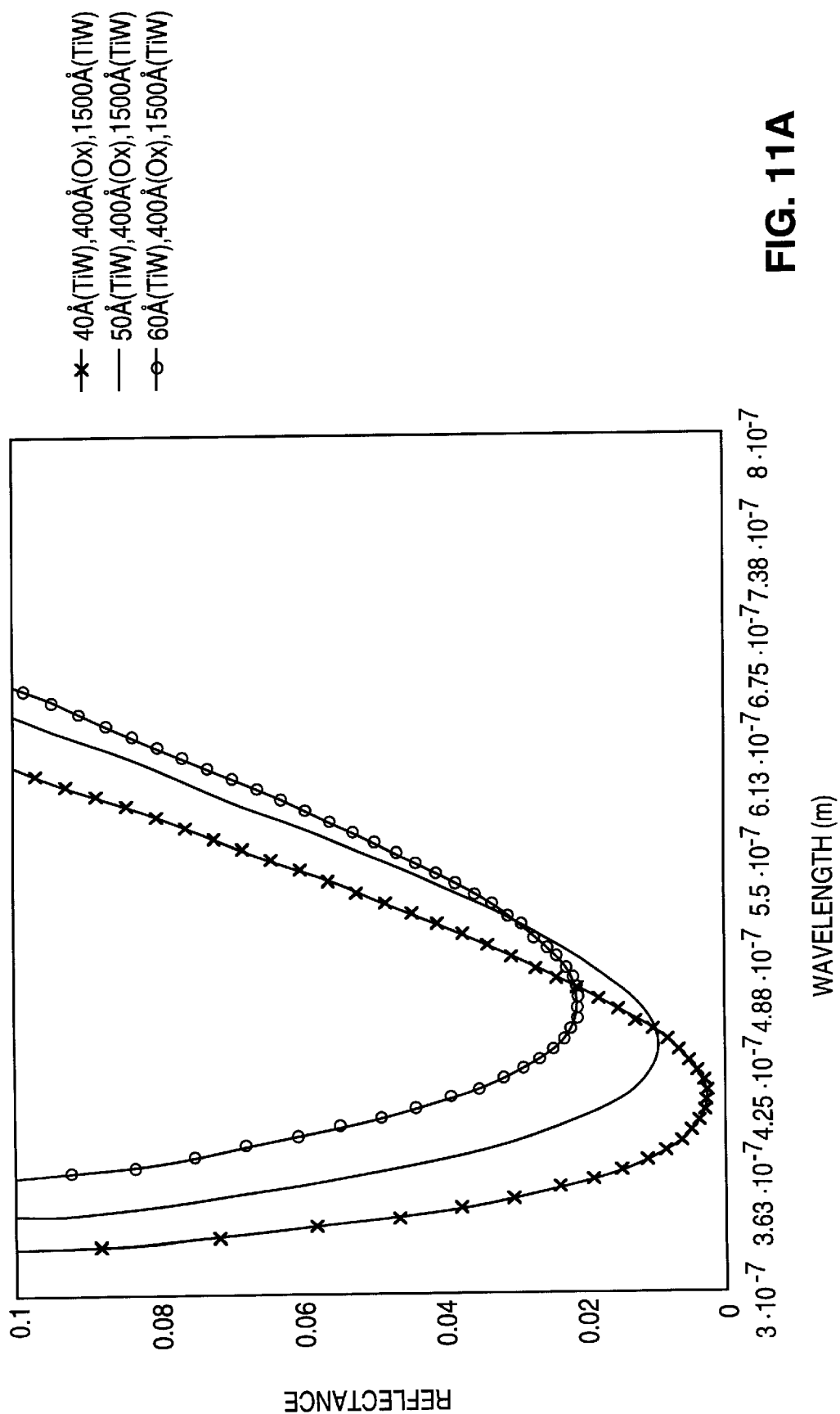
FIGS. 11A–11C illustrate the results of computer modeling of reflectance of a variety of three-layered light absorbing thin film stacks utilizing TiW for the top and backstopping layers.
Figure 11B:
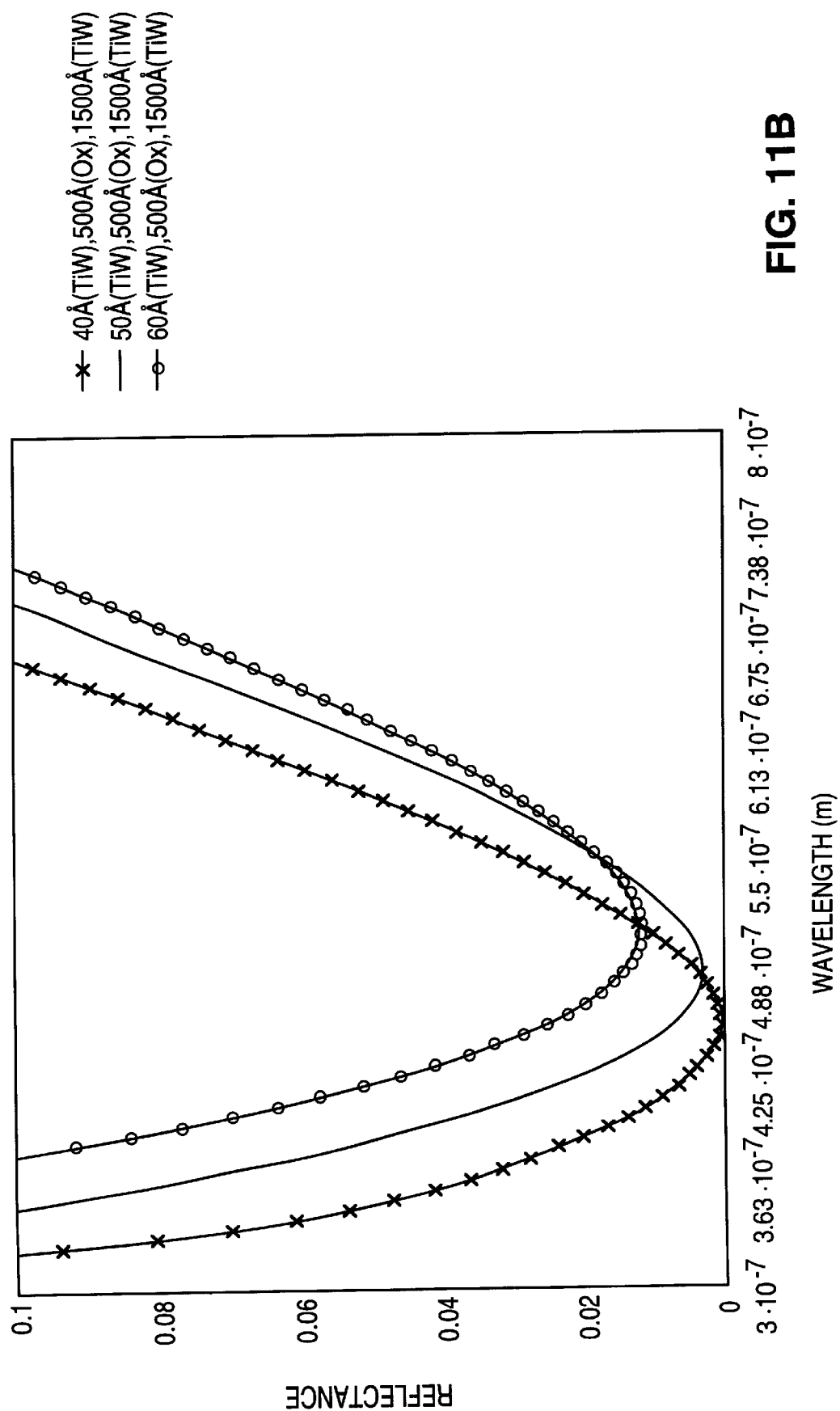
Figure 11C:
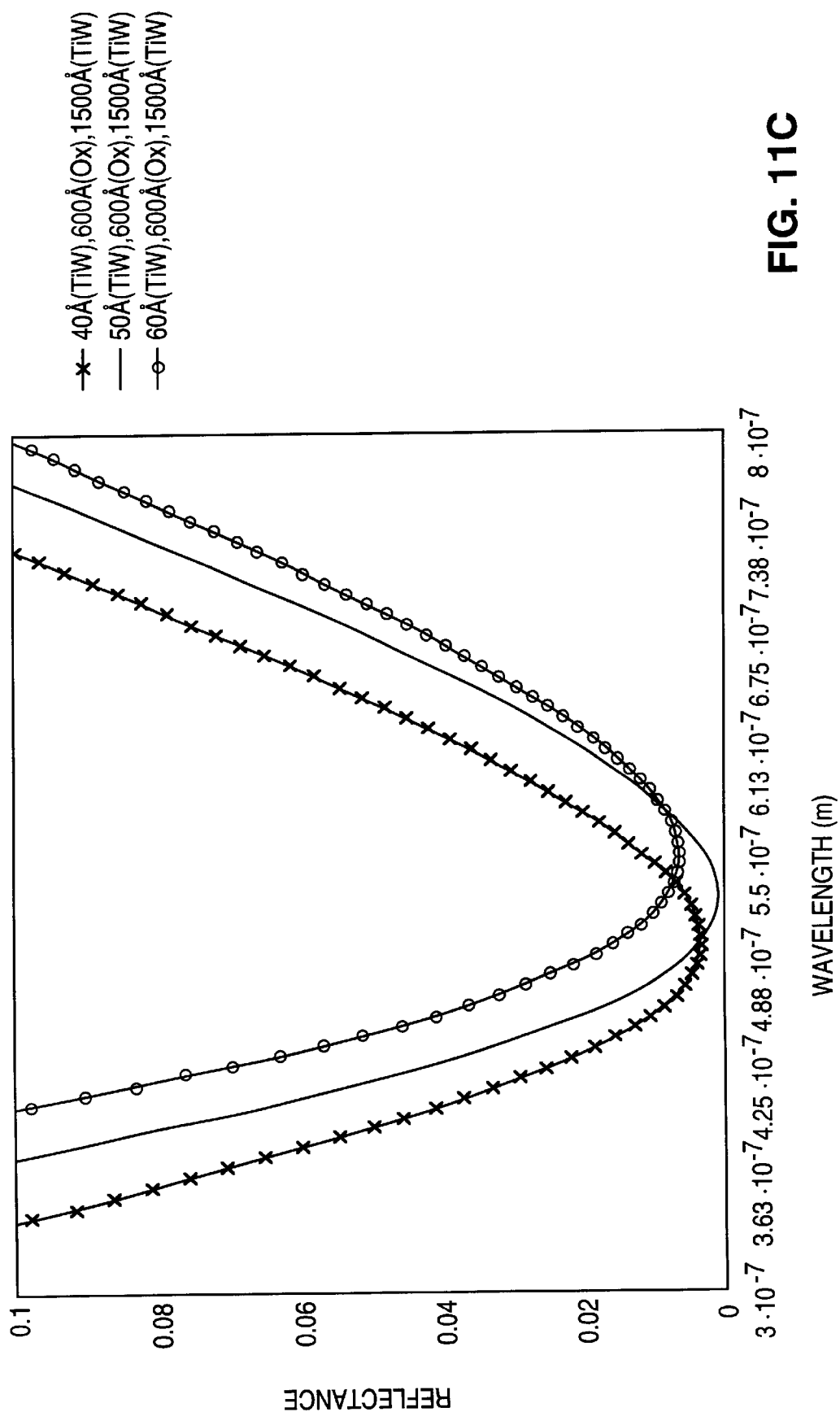

Any number of sufficiently absorptive materials are suitable for the substantially absorbing layers forming the top and backstopping layers of the stack. Materials having 1) an index of refraction of between about 1.3 and 6, and 2) an extinction coefficient of between about 0.8 and 7, will exhibit acceptable absorbance. Examples of such materials include, but are not limited to, amorphous silicon and TiW. FIGS. 11A–11C illustrate the results of computer modeling of reflectance of a variety of three-layered light absorbing thin film stacks utilizing TiW for the top and backstopping layers.

FIG. 11A plots reflectance for a set of light absorbing thin film stacks having a 1500 Å TiW backstopping layer, a 400 Å $SiO_2$ middle layer, and a top TiW layer of thickness 40 Å, 50 Å, or 60 Å.

FIG. 11B plots reflectance for a set of light absorbing thin film stacks having a 1500 Å TiW backstopping layer, a 500 Å $SiO_2$ middle layer, and a top TiW layer of thickness 40 Å, 50 Å, or 60 Å.

FIG. 11C plots reflectance for a set of light absorbing thin film stacks having a 1750 Å TiW backstopping layer, a 600 Å $SiO_2$ middle layer and a top TiW layer of thickness 40 Å, 50 Å, or 60 Å.

It is also important to recognize that formation of a light absorbing layer in accordance with the present invention must occur in conjunction with processing steps utilized to form the other structures of the light valve. Silicon dioxide is thus preferred over silicon nitride for the substantially nonabsorbing middle layer due to its susceptibility to etching with chlorine based systems used to fabricate the intermetal dielectric layer.

Moreover, while the light valve depicted in FIG. 4 incorporates a thin film stack 451 within highest intermetal dielectric layer 428 of interconnect 404, the light absorbing stack could also be placed at other locations within the interconnect 404. For example, the stack could be located for example on top of an intermetal dielectric layer, or on top of an interconnect metallization layer, and still remain within the scope of the present invention.

Therefore, it is intended that the following claims define the scope of the present invention, and that the methods and structures within the scope of these claims and their equivalents be covered hereby.

What is claimed is:
1. A liquid crystal light valve structure comprising:
(a) A translucent top plate;
(b) a plurality of pixel cell structures vertically spaced-apart from the top plate, but bonded to the top plate by a sealing member to define an inner cavity between the top plate and the plurality of pixel cell structures;
(c) liquid crystal material disposed in the inner cavity;
each pixel cell structure including:
(i) a storage capacitor formed on a silicon substrate and including an upper metal plate formed from a first metallization layer and separated fro the silicon substrate by a first intermetal dielectric layer;
(ii) a second metallization layer portion formed above and separated from the upper metal plate of the storage capacitor by a second intermetal dielectric layer, and electrically connected to the upper metal plate by a first conductive plug that extends through the second intermetal dielectric layer;
(iii) a pixel electrode formed from a third metallization layer, the pixel electrode formed above and separated from the second metallization layer portion by a third intermetal dielectric layer, and electrically connected to the second metallization layer portion by a second conductive plug that extends through the third intermetal dielectric layer, and wherein vertically adjacent pixel electrodes are spaced-apart by a gap formed therebetween, and
and wherein the third intermetal dielectric layer has a light absorbing thin film stack formed therein, the thin film stack being formed to extend beneath said gap between adjacent pixel electrodes and comprising (a) an upper TiN layer;
(b) an intermediate $SiO_2$ layer; and
(c) a lower TiN layer.
2. The liquid crystal light valve structure of claim 1, and wherein the upper TIN layer is about 100 Å thick, the intermediate $SiO_2$ layer is about 550 Å thick, and the lower TiN layer is about 1700 Å thick.
3. The liquid crystal light valve structure of claim 1, and wherein the light absorbing thin film stack further comprises a lower $SiO_2$ layer formed beneath the lower TiN layer and a bottom TIN layer formed beneath the lower $SiO_2$ layer.
4. The liquid crystal light valve structure of claim 3, and wherein the upper TiN layer is about 100–150 Å thick, the intermediate $SiO_2$ layer is about 500–700 Å thick, the lower TiN layer is about 100 Å thick, the lower $SiO_2$ layer is about 400 Å thick, and the bottom TiN layer is about 1750 Å thick.

* * * * *

UNITED STATES PATENT AND TRADEMARK OFFICE
CERTIFICATE OF CORRECTION

PATENT NO. : 6,452,652 B1
DATED : September 17, 2002
INVENTOR(S) : Paul M. Moore It is certified that error appears in the above-identified patent and that said Letters Patent is hereby corrected as shown below:

Column 10,
Line 3, change "(a) A" to -- (a) a --.
Line 12, change "fro the silicon" to -- from the silicon --.
Line 28, change "and wherein" to -- wherein --.
Lines 31-32, change "gap between adjacent pixel electrodes and comprising (a) an upper TiN layer;" to: -- gap between adjacent pixel electrodes and comprising:
(a) an upper TiN layer; --.
Lines 36 and 42, change "TIN" to -- TiN --.

Signed and Sealed this

Eleventh Day of February, 2003

JAMES E. ROGAN
*Director of the United States Patent and Trademark Office*